United States Patent
Obayashi et al.

[11] Patent Number: 6,025,292
[45] Date of Patent: Feb. 15, 2000

[54] METHOD FOR THE REGENERATION OF A DENITRATION CATALYST

[75] Inventors: Yoshiaki Obayashi; Kouzo Iida, both of Hiroshima; Atsushi Morii, Nagasaki; Osamu Naito, Nagasaki; Akira Hattori, Nagasaki, all of Japan

[73] Assignee: Mitsubishi Heavy Industries Ltd., Tokyo, Japan

[21] Appl. No.: 09/023,219

[22] Filed: Feb. 12, 1998

[30] Foreign Application Priority Data

Feb. 27, 1997 [JP] Japan ................................. 9-043442

[51] Int. Cl.⁷ .............................. B01J 38/60; B01J 27/28
[52] U.S. Cl. ................................. 502/27; 502/22
[58] Field of Search ........................... 502/22, 27

[56] References Cited

U.S. PATENT DOCUMENTS 3,635,838  1/1972  Gatsis et al. ........................... 252/415
4,615,991 10/1986  Obayashi et al. ........................ 502/28
4,833,113  5/1989  Imanari et al. ......................... 502/309

FOREIGN PATENT DOCUMENTS 63001429  1/1988  Japan ............................. B01D 53/36

*Primary Examiner*—John F. Niebling
*Assistant Examiner*—Alexander G. Ghyka
*Attorney, Agent, or Firm*—Myers Bigel Sibley & Sajovec, P.A.

[57] ABSTRACT

Disclosed are (1) a method for the regeneration of a denitration catalyst wherein, in order to regenerate a denitration catalyst having reduced denitration power, the catalyst is cleaned with a cleaning fluid having a hydrofluoric acid concentration of 0.3 to 3% by weight and maintained at a temperature of 20 to 80° C., and (2) a method for the regeneration of a denitration catalyst which comprises the steps of cleaning a denitration catalyst having reduced denitration power under the conditions described in (1) above, drying the cleaned catalyst, and impregnating the catalyst with a catalytically active component so as to support it on the catalyst.

2 Claims, 1 Drawing Sheet

METHOD FOR THE REGENERATION OF A DENITRATION CATALYST

BACKGROUND OF THE INVENTION

1. Field of the Invention

This invention relates to a method for the regeneration of a denitration catalyst.

2. Description of the Related Art

In order to remove nitrogen oxides (hereinafter referred to as $NO_x$) produced in boilers and various combustion furnaces for the purpose of preventing air pollution, a catalytic ammonia reduction process wherein ammonia is used as a reducing agent and nitrogen oxides are decomposed to nitrogen and water by contact with a catalyst is being widely employed. Most of the NOx removal catalysts currently used for practical purposes are honeycomb-shaped catalysts which have through-holes of square cross section in 1–10 order to prevent clogging with dust present in exhaust gas and increase the gas contact area. With respect to catalyst components, titanium oxide is highly suitable for use as a principal component, and vanadium, tungsten and the like are commonly used as active components. Thus, $TiO_2$—$WO_3$ binary catalysts and $TiO_2$—$V_2O_5$—$WO_3$ ternary catalysts are popularly used. The catalytic power of such a denitration catalyst tends to be gradually reduced with service time, and the cause for the reduction in catalytic power varies according to the type of the used in the source of exhaust gas (e.g., boiler).

For example, in the case of exhaust gas from an oil-fired boiler, sodium contained in the dust present in exhaust gas is chiefly deposited on the catalyst and causes a reduction in catalytic power. In the c ase of exhaust gas from a coal-fired boiler, calcium contained in the dust present in exhaust gas is chiefly deposited on the catalyst surfaces and reacts with sulfuric anhydride present in the exhaust gas to form calcium sulfate. This calcium sulfate covers the catalyst surfaces and hinders NO and $NH_3$ gases from diffusing into the interior of the catalyst, resulting in reduced catalytic power. It has conventionally been known that catalysts having reduced catalytic power attributable to these causes can be effectively regenerated by cleaning them with water or an aqueous solution of hydrochloric acid.

However, the conventional cleaning method using water or an aqueous solution of hydrochloric acid exhibits little regenerative effect on some catalysts. No effective method for the regeneration of such catalysts has been known in the prior art.

SUMMARY OF THE INVENTION

In the course of tests on the regeneration of catalysts which have been used in exhaust gas from coal-fired boilers, the present inventors have found that some catalysts can hardly be regenerated by the conventional cleaning method using water or an aqueous solution of hydrochloric acid. An investigation on the cause thereof has revealed that a high concentration of silica ($SiO_2$) is present on the surfaces of the catalysts which cannot be regenerated by cleaning with water or an aqueous solution of hydrochloric acid.

Meanwhile, denitration catalysts used in exhaust gas produced by the combustion of gas generally show little deterioration. However, some catalysts used in exhaust gas from gas turbines have recently been found to show a marked reduction in catalytic power. An investigation on these catalysts has also revealed that a high concentration of silica is present on the surfaces thereof and they can hardly be regenerated by the conventional cleaning method using water or an aqueous solution of hydrochloric acid.

In order to clear up the cause of the deposition of silica on the surfaces of a catalyst used in exhaust gas produced by the combustion of gas, the fuel used in the source of exhaust gas was investigated. As a result, the fuel gas used in this gas turbine was found to comprise not only LNG, but also digestion gas obtained by the digestion of sludge used in sewage disposal. Consequently, the digestion gas was analyzed for silicon compounds, which revealed the presence of organic silicon compounds (silicones). Thus, it is conceivable that a portion of the siloxane (~Si~O~Si~) forming the basic skeletons of silicones remains, becomes adsorbed on the catalyst surfaces and is deposited in form of silica produced by the decomposition thereof, or fine silica particles of submicron size are produced by the combustion of organic silicone compounds and deposited on the catalyst.

The present invention has been completed on the basis of these findings.

In view of the above-described discovery, the present invention relates to (1) a method for the regeneration of a denitration catalyst wherein, in order to regenerate a denitration catalyst having reduced denitration power, the catalyst is cleaned with a cleaning fluid having a hydrofluoric acid concentration of 0.3 to 3% by weight and maintained at a temperature of 20 to 80° C., and (2) a method for the regeneration of a denitration catalyst which comprises the steps of cleaning a denitration catalyst having reduced denitration power under the conditions described in (1) above, drying the cleaned catalyst, and impregnating the catalyst with a catalytically active component so as to support it on the catalyst.

In the present invention, silica compounds (chiefly silicon dioxide) deposited on a catalyst are cleaned with an aqueous solution of hydrofluoric acid and reacted according to the following reaction formula:

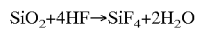

$$SiO_2 + 4HF \rightarrow SiF_4 + 2H_2O$$

The resulting water-soluble silicon tetrafluoride ($SiF_4$) is dissolved in the cleaning fluid. Thus, the silica compounds deposited on the catalyst surfaces can be removed.

Where hardly soluble silica compounds are deposited on the catalyst surfaces, it is difficult to dissolve them if the cleaning fluid containing hydrofluoric acid has an ordinary temperature (20° C.). Consequently, in order to enhance the cleaning effect, the temperature of the cleaning fluid needs to be raised. In this case, the cleaning effect is enhanced, but an increased amount of vanadium forming a catalytically active component is dissolved out, resulting in a reduction in the vanadium concentration remaining in the catalyst. Thus, although silica compounds responsible for the reduced denitration power have been removed, it is apparently impossible to restore the denitration power. Accordingly, where an increased amount of vanadium is dissolved out from the catalyst under certain cleaning conditions, it is necessary to restore the catalytic power by impregnating the catalyst with vanadium so as to support it on the catalyst.

Conventionally, catalysts having reduced catalytic power due to the deposition of silica compounds have been incapable of regeneration and hence disposed of. However, the present invention makes it possible to regenerate such catalysts and thereby reduce the amount of industrial waste. Thus, the present invention brings about significant industrial effects.

DETAILED DESCRIPTION OF THE PREFERRED EMBODIMENTS

Figure 1:
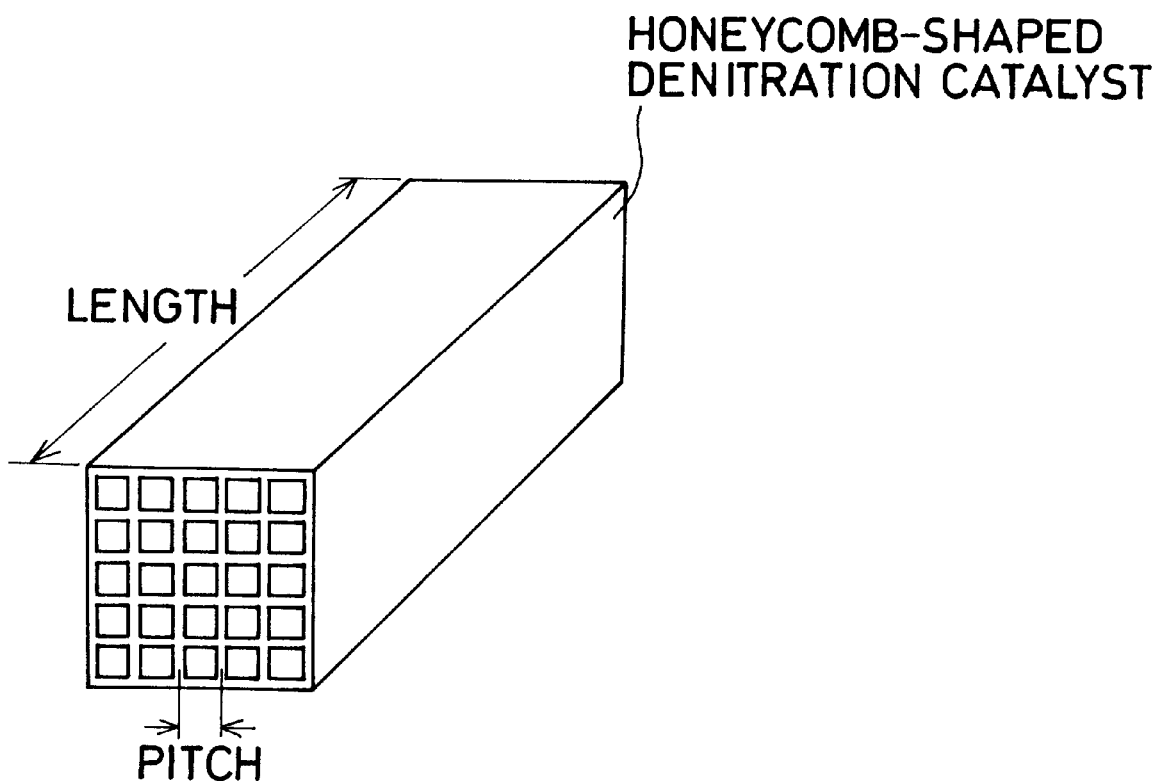
FIG. 1 is a perspective view of a honeycomb-shaped denitration catalyst used in the examples of the present invention which will be given later.

The present invention relates to the regeneration of a denitration catalyst used for the removal of nitrogen oxides present in combustion exhaust gas. That is, when its catalytic power is reduced owing to silica deposited on the catalyst surfaces, the catalyst can be regenerated by cleaning it with an aqueous solution of hydrofluoric acid (HF) to dissolve the silica deposited on the catalyst surfaces in the form of silicon tetrafluoride. If the hydrofluoric acid concentration is unduly low, a sufficient regenerative effect will not be obtained. On the other hand, if the hydrofluoric acid concentration is unduly high, a satisfactory regenerative effect is achieved, but part of the silica contained in the clay (e.g., acid clay or diatomaceous earth) and glass fibers (consisting chiefly of silica) which are added to the catalyst in an amount of several to ten-odd percent during its fabrication for the purpose of maintaining the strength of the catalyst is also dissolved. As a result, the strength of the catalyst may be reduced to a level lower than that required for use in actual plants. Accordingly, in order to obtain a regenerative effect while maintaining the strength of the catalyst, it is necessary to clean the catalyst with an aqueous solution having a hydrofluoric acid concentration of 0.3 to 3% by weight.

Moreover, where the silica deposited on the catalyst surfaces exists in a hardly soluble form, a sufficient regenerative effect may not be obtained by using an aqueous solution of hydrofluoric acid having an ordinary temperature. In such a case, the hardly soluble silica deposited on the catalyst surfaces can be removed by raising the temperature of the hydrofluoric acid-containing cleaning fluid to 20–80° C. However, when the temperature of the hydrofluoric acid-containing cleaning fluid becomes higher, vanadium forming a catalytically active component is dissolved out from the catalyst, thus causing a reduction in denitration power due to a decreased vanadium concentration in the catalyst. Consequently, according to the present invention, after the catalyst is freed of silica compounds, washed with water and dried, the catalyst is impregnated with vanadium so that vanadium is supported on the catalyst and the vanadium concentration in the catalyst is thereby adjusted to its level before cleaning. In order to impregnate the catalyst with vanadium, the catalyst is soaked in an aqueous solution prepared by dissolving a vanadium compound (e.g., vanadium pentoxide, ammonium metavanadate or vanadyl sulfate) in water, a solution of an organic acid, or a solution of an amine.

In order to demonstrate the effects of the present invention, the following examples and comparative examples are given.

EXAMPLE 1

Six denitration catalysts (composed of 89.2% by weight of $TiO_2$, 10.2% by weight of $WO_3$, and 0.6% by weight of $V_2O_5$) having a honeycomb configuration with a pitch of 7.4 mm as shown in FIG. 1 were provided. These catalysts had been used in exhaust gas from coal-fired boiler plant A for about 23,000 hours and hence had reduced denitration power. In order to regenerate these catalysts, each of them was soaked in 4.0 volumes of a cleaning fluid comprising an aqueous solution having an HF concentration of 0.03, 0.1, 0.3, 1, 3 or 5% by weight, allowed to stand at 20° C. for 4 hours, washed with water, and then dried. The catalysts so treated are referred to as "Catalysts 1–6".

Comparative Example 1

Two denitration catalysts similar to those treated in Example 1 were provided. In order to regenerate these catalysts, each of them was soaked in 4.0 volumes of a cleaning fluid comprising water or an aqueous solution having an HCl concentration of 1% by weight, allowed to stand at 20° C. for 4 hours, washed with water, and then dried. The catalysts so treated are referred to as "Catalysts 51 and 61".

EXAMPLE 2

Twelve denitration catalysts (composed of 89.2% by weight of $TiO_2$, 10.2% by weight of $WO_3$, and 0.6% by weight of $V_2O_5$) having a honeycomb configuration with a pitch of 7.4 mm were provided. These catalysts had been used in coal-fired boiler plant B for about 45,000 hours and hence had reduced denitration power. In order to regenerate these catalysts, each of them was soaked in 4.0 volumes of a cleaning fluid comprising an aqueous solution having an HF concentration of 0.3, 1.0 or 3.0% by weight, allowed to stand for 4 hours while maintaining the temperature of the cleaning fluid at 20, 40, 60 or 80° C., washed with water, and then dried. The catalysts so treated are referred to as "Catalysts 7–18". Furthermore, these catalysts were soaked in a solution prepared by dissolving vanadium pentoxide in an aqueous solution of oxalic acid, so that the vanadium concentration in the catalysts was adjusted to its level before cleaning. The catalysts thus obtained are referred to as "Catalysts 19–30".

Comparative Example 2

Two denitration catalysts similar to those treated in Example 2 were provided. In order to regenerate these catalysts, each of them was treated in the same manner as described in Example 2, except that water or an aqueous solution having an HCl concentration of 1% by weight was used as the cleaning fluid and the temperature thereof was maintained at 40° C. The catalysts so treated are referred to as "Catalysts 52 and 62". Furthermore, Catalyst 62 was worked up in the same manner as described in Example 2, so that the vanadium concentration in the catalyst was adjusted to its level before cleaning. The catalyst thus obtained is referred to as "Catalyst 63".

EXAMPLE 3

A denitration catalyst (composed of 86.5% by weight of $TiO_2$, 9.8% by weight of $WO_3$, and 3.7% by weight of $V_2O_5$) having a honeycomb configuration with a pitch of 3.3 mm was provided. This catalyst had been used in gas turbine plant C coal-fired boiler plant B using digestion gas produced by the digestion of sewage sludge in sewage disposal as part of the fuel for about 5,000 hours and hence had reduced denitration power. In order to regenerate this catalyst, it was soaked in 4.0 volumes of a cleaning fluid comprising an aqueous solution having an HF concentration of 1% by weight, allowed to stand at 60° C. for 3 hours, washed with water, and then dried. The catalyst so treated is referred to as "Catalyst 31". Furthermore, this catalyst was soaked in a solution prepared by dissolving vanadium pentoxide in an aqueous solution of oxalic acid, so that the vanadium concentration in the catalysts was adjusted to its level before cleaning. The catalyst thus obtained is referred to as "Catalysts 32".

Comparative Example 3

Two denitration catalysts similar to those treated in Example 3 were provided. In order to regenerate these catalysts, each of them was treated in the same manner as described in Example 3, except that water or an aqueous solution having an HCl concentration of 1% by weight was used as the cleaning fluid. The catalysts so treated are referred to as "Catalysts 54 and 64". Furthermore, Catalyst 64 was worked up in the same manner as described in Example 3, so that the vanadium concentration in the catalyst was adjusted to its level before cleaning. The catalyst thus obtained is referred to as "Catalyst 65".

Experiments

The unused catalysts and used catalysts for coal-fired boiler plants A and B and gas turbine plant C, and the catalysts obtained in the foregoing examples and comparative examples were comparatively tested for denitration power under the conditions shown in Table 1. In Examples 1 and 2, the compressive strengths of the catalysts were also measured. The results thus obtained are shown in Tables 2, 3 and 4.

TABLE 1

| | Testing conditions | |
|---|---|---|
| Test sample Item | Catalyst for coal-fired boilers | Catalyst for gas turbines |
| Shape of catalyst | 46 mm × 53 mm × 800 mm(L) | 43 mm × 53 mm × 500 mm(L) |
| Flow rate of gas | 20.2 Nm$^3$/m$^2$ · hr | 23.0 Nm$^3$/m$^2$ · hr |
| SV value | 10,400 hr$^{-1}$ | 20,200 hr$^{-1}$ |
| NH$_3$/NO$_x$ ratio | 1.0 | 1.0 |
| Temperature of gas | 380° C. | 370° C. |
| Composition of gas | NO$_x$ = 150 ppm | NO$_x$ = 65 ppm |
| | NH$_3$ = 150 ppm | NH$_3$ = 65 ppm |
| | SO$_x$ = 800 ppm | SO$_x$ = 0 ppm |

TABLE 1-continued

| | Testing conditions | |
|---|---|---|
| Test sample Item | Catalyst for coal-fired boilers | Catalyst for gas turbines |
| | O$_2$ = 4% | O$_2$ = 14% |
| | CO$_2$ = 12% | CO$_2$ = 5% |
| | H$_2$O = 11% | H$_2$O = 5% |
| | N$_2$ = Balance | N$_2$ = Balance |

TABLE 2

Test results

| Plant | Example and Comparative Example | | Catalyst | Degree of denitration (%) | Compressive strength ratio |
|---|---|---|---|---|---|
| A (coal-fired) | Example 1 | 0.03% HF | 1 | 73.1 | 1.03 |
| | | 0.1% HF | 2 | 78.0 | 1.05 |
| | | 0.3% HF | 3 | 80.7 | 1.00 |
| | | 1% HF | 4 | 80.9 | 0.95 |
| | | 3% HF | 5 | 80.9 | 0.92 |
| | | 5% HF | 6 | 80.7 | 0.47 |
| | Comparative Example 1 | | 51 | 71.0 | — |
| | | | 61 | 71.0 | — |
| | — | | Used catalyst | 67.9 | 1.05 |
| | — | | Unused catalyst | 80.7 | 1.00 |

○ Degree of denitration (%) = {[(Inlet NO$_x$ content) - (Outlet NO$_x$ content)]/ (Inlet NO$_x$ content)} × 100
○ Compressive strength ratio = (Compressive strength of test sample)/ (Compressive strength of unused catalyst)

TABLE 3

Test results

| Plant | Example and Comparative Example | Cleaning conditions | | Catalyst | Degree of denitration (%) | Compressive strength ratio |
|---|---|---|---|---|---|---|
| | | Cleaning fluid | Temperature (° C.) | | | |
| B (coal-fired) | Example 2 | 0.3% HF | 20 | 7 | 66.8 | — |
| | | | | 19 | 74.0 | 1.00 |
| | | | 40 | 8 | 69.4 | — |
| | | | | 20 | 80.5 | 0.98 |
| | | | 60 | 9 | 68.5 | — |
| | | | | 21 | 80.8 | 0.96 |
| | | | 80 | 10 | 67.6 | — |
| | | | | 22 | 81.1 | 0.90 |
| | | 1.0% HF | 20 | 11 | 67.1 | — |
| | | | | 23 | 74.7 | 0.95 |
| | | | 40 | 12 | 69.0 | — |
| | | | | 24 | 81.5 | 0.93 |
| | | | 60 | 13 | 68.7 | — |
| | | | | 25 | 81.0 | 0.94 |
| | | | 80 | 14 | 65.3 | — |
| | | | | 26 | 81.2 | 0.85 |
| | | 3.0% HF | 20 | 15 | 67.4 | — |
| | | | | 27 | 75.3 | 0.92 |
| | | | 40 | 16 | 69.0 | — |
| | | | | 28 | 81.3 | 0.90 |
| | | | 60 | 17 | 68.0 | — |
| | | | | 29 | 81.5 | 0.90 |
| | | | 80 | 18 | 64.3 | — |
| | | | | 30 | 81.0 | 0.80 |
| | Comparative Example 2 | Water | 40 | 52 | 66.4 | — |
| | | 1.0% HCl | 40 | 62 | 67.6 | — |
| | | | 40 | 63 | 71.6 | — |
| | — | | | Used catalyst | 66.8 | 1.09 |

TABLE 3-continued

Test results

| Plant | Example and Comparative Example | Cleaning fluid | Tempera-ture (° C.) | Catalyst | Degree of denitration (%) | Compressive strength ratio |
|---|---|---|---|---|---|---|
| | | — | | Unused catalyst | 80.7 | 1.00 |

° Degree of denitration (%) = {[(Inlet $NO_x$ content) − (Outlet $NO_x$ content)]/(Inlet $NO_x$ content)} × 100
° Compressive strength ratio = (Compressive strength of test sample)/(Compressive strength of unused catalyst)

TABLE 4

Test results

| Plant | Example and Comparative Example | Catalyst | Degree of denitration (%) |
|---|---|---|---|
| C (gas turbine) | Example 3 | 31 | 94.5 |
| | | 32 | 95.5 |
| | Comparative Example 3 | 54 | 86.0 |
| | | 64 | 86.2 |
| | | 65 | 86.2 |
| | — | Used catalyst | 86.0 |
| | — | Unused catalyst | 96.7 |

∘ Degree of denitration (%) = {[(Inlet $NO_x$ content) - (Outlet $NO_x$ content)]/(Inlet $NO_x$ content)} × 100

It can be seen from these results that, when a catalyst having reduced denitration power due to the deposition of silica compounds on the catalyst surfaces is regenerated with the aid of a cleaning fluid, its effect will be insufficient if the hydrofluoric acid concentration of the cleaning fluid is less than 0.3% by weight. On the other hand, the denitration power is restored at a hydrofluoric acid concentration greater than 3% by weight, but part of the silica contained in the clay and glass fibers added to the catalyst during its fabrication for the purpose of maintaining the strength of the catalyst is also dissolved to cause a reduction in strength. Consequently, the hydrofluoric acid concentration of the cleaning fluid should preferably be in the range of 0.3 to 3% by weight.

Moreover, it can be seen from the results of Example 2 that, when the silica compounds deposited on the catalyst surfaces are hardly soluble ones, they can hardly be dissolved if the cleaning fluid has a temperature of 20° C. or so, and a sufficient regenerative effect may not be obtained. In such a case, it is necessary to heat the cleaning fluid to 40° C. or above. However, if the temperature of the cleaning fluid reaches 80° C., the strength of the catalyst will be reduced. Accordingly, the temperature of the cleaning fluid should preferably be in the range of 40 to 60° C.

When the cleaning fluid has a temperature of 40° C. or above, vanadium forming a catalytically active component is dissolved out during cleaning, thus causing a reduction in catalytic power. However, it has been found that, after silica compounds are removed by dissolution, the catalyst can be regenerated by impregnating the catalyst with the lost vanadium.

We claim:

1. A method for the regeneration of a denitration catalyst which comprises the steps of:

cleaning a denitration catalyst having reduced denitration power with a cleaning fluid, said cleaning fluid having a hydrofluoric acid concentration of 0.3 to 3% by weight and maintained at a temperature of 20 to 80° C.;

drying the cleaned catalyst; and impregnating the catalyst with a catalytically active component so as to support it on said catalyst;

wherein said catalytically active component is vanadium.

2. A method for the regeneration of a denitration catalyst as claimed in claim 1 wherein the catalyst is cleaned with the cleaning fluid maintained at a temperature of 40 to 60° C.

* * * * *